United States Patent [19]

Galliath et al.

[11] 3,993,495
[45] Nov. 23, 1976

[54] POROUS CERAMIC ARTICLES AND METHOD FOR MAKING SAME

[75] Inventors: André Paul Galliath, Valencia; Valentine Eugene Weis, Glendale, both of Calif.

[73] Assignee: Interpace Corporation, Parsippany, N.J.

[22] Filed: July 29, 1974

[21] Appl. No.: 492,423

[52] U.S. Cl. ............................... 106/40 R; 106/54; 106/38.9; 106/65; 106/73.4; 264/43; 264/63; 264/66
[51] Int. Cl.$^2$ ...................... C03C 3/22; B28B 7/28; B28B 7/34
[58] Field of Search .................. 106/40 R, 40 V, 41, 106/54, 65, 73.4, 38.9; 264/43, 63, 66

[56] References Cited
UNITED STATES PATENTS

| | | | |
|---|---|---|---|
| 1,842,186 | 1/1932 | McBerty | 264/43 |
| 2,123,536 | 7/1938 | Long | 106/40 V |

Primary Examiner—Winston A. Douglas
Assistant Examiner—John F. Niebling
Attorney, Agent, or Firm—Poms, Smith, Lande & Glenny

[57] ABSTRACT

There is disclosed a fired ceramic article such as a mold or die having no surface flaws; a uniform open porosity of at least 20% by volume, average pore size in the range of 1–10 microns, high abrasion resistance, a modulus of rupture of at least 4,000 psi; the fired article being substantially the same size as the corresponding unfired article and consisting essentially of 30 to 90% by weight of refractory abrasive particles such as alumina and 70 to 10% by weight of glass particles, said glass particles containing crystals grown during firing of the article, thereby greatly increasing the strength of the article, said particles being bonded by sintering while said particles are in the solid state. There is also disclosed a method for producing the fired ceramic article which includes the steps of forming a mixture of from 30 to 90% abrasive particles and 70 to 10% of glass particles (by weight based on the total amount of abrasive particles and glass particles) and adding a sufficient amount of organic binding agent and water to form, for example, a mold or die of desired shape, removing the organic binder and water by raising the temperature of the mold or die at a rate whereby the entire mold or die has substantially the same temperature and until the mold or die reaches a temperature above which the binder vaporizes and below and near the fusion range of the glass, and holding the article at this temperature until a solid state bond is formed because of sintering between the particles.

13 Claims, No Drawings

POROUS CERAMIC ARTICLES AND METHOD FOR MAKING SAME

BACKGROUND OF THE INVENTION

A large proportion of ceramic ware is produced by casting or mechanical working in permeable or porous molds or dies. In general, such molds have been made of plaster of paris because it possesses the excellent permeability and porosity necessary for producing ceramic ware. The pores of the plaster of paris absorb the water from the clay or similar material utilized for ceramic ware forming. More particularly, plaster of paris molds are utilized almost exclusively in the so-called Ram process wherein moist clay is pressed between mold halfs and the moisture enters the pores of the plaster of paris mold. The resulting pressed clay is then released from the mold by passing a fluid such as gas (e.g. air) through the pores in the mold.

Even though plaster of paris and other gypsum based materials have been relatively satisfactory for use in producing porous or permeable molds they nevertheless have significant drawbacks which, in general, are low mechanical strength, low abrasion resistance, low thermal shock resistance, and significant chemical solubility in water. These deficiencies in molds made from plaster of paris or other gypsum based material leads to a short service life because, inter alia, repeated pressings quickly erodes away the pressing face and tends to break the edges of the mold cavity, causing it to be discarded after only a few hundred pressings. Moreover, the low mechanical strength of the material necessitates the use of heavy metal casing to prevent the mold from cracking during a pressing operation; in many instances molds are lost in the first pressing due to this problem.

The obvious disadvantages of porous molds based on gypsum based materials has caused prior art workers to attempt to develop porous molds which have porosity and permeability characteristics similar to molds made out of plaster of paris but which have good mechanical strength, abrasion resistance, thermal shock resistance, and low water solubility. To date, however, even though many patents have been issued on porous molds, none, to our knowledge, have been placed in commercial production. The reason for this is probably because molds having higher mechanical strength than molds made of plaster and gypsum based materials do not have the requisite porosity and permeability and, most importantly, have surface flaws which ruin the mold for pressing purposes.

It should be noted that a mold merely possessing proper pore size distribution is not necessarily adequate as a mold where the ware is released by purging with air because it is absolutely necessary to have interconnected pores in order to have purging action equivalent to plaster of paris or gypsum materials. Moreover, it is important that during firing of the mold that the fired mold have approximately the same size as its corresponding unfired mold.

SUMMARY OF THE INVENTION

The present invention provides a composition and method for making same which has a pore size distribution equalling that of conventional gypsum cements and plasters but, at the same time, has superior physical properties which allow the composition, when made into a mold, to last much longer than conventional plaster of paris molds because of high mechanical strength, etc. In addition the molds of this invention can also be utilized at very high temperatures and in corrosive environments with no adverse effects. Because the compositions and articles of this invention have such excellent physical and chemical properties and because they can have any desired form or shape the articles have many uses. Exemplary of such uses are dies for vacuum forming of plastic products as well as gas diffusers. However, it is emphasized that the articles of the present invention can be utilized in any environment where open porosity, high abrasion resistance, high mechanical strength and/or resistance to high temperatures or corrosive environments is required or desirable.

Therefore, the primary object of the present invention is to disclose and provide an article and method for making same wherein the article, when fired, has uniform open porosity of at least 20% by volume and preferably 30% by volume, an average pore size in the range of 1–10 microns and preferably less than about 5 microns, high abrasion resistance, and a modulus of rupture of at least 4,000 psi.

Another object of the present invention is to disclose and provide a composition having the desirable characteristics of plaster of paris molds but, at the same time; having superior mechanical properties which make it long lasting.

Still a further object of the present invention is to disclose and provide a porous mold and composition for making same which has a modulus of rupture of at least 4,000 psi and preferably at least 5,000 psi and no surface flaws, thereby allowing the mold to be utilized for pressing ceramic ware for significant extended periods.

Still another and further object of the present invention is to disclose a porous mold which is initially composed of glass particles and abrasive particles such as alumina, the particles being bonded together in such a manner that the glass has secondary crystals formed during firing which greatly increases the strength of the resulting mold but, at the same time, gives it a desirable porosity equalling that of corresponding plaster of paris molds.

These and other objects will be apparent from the following detailed description of presently preferred embodiments of this invention wherein all parts and percentages are by weight, unless otherwise expressly stated, and all temperatures are in degrees Fahrenheit.

DESCRIPTION OF THE PREFERRED EMBODIMENTS

The foregoing objects and others are accomplished by the present invention which, in part, resides in the surprising discovery that a porous ceramic article having the above enumerated properties can be produced by slowly heating a mixture of glass particles and abrasive particles (such as alumina) to a temperature just below the softening or fusion range of glass, maintaining the temperature at this point until the article has a modulus of rupture of at least 4,000 psi and preferably 5,000 psi and then allowing the article to cool. Firing in such a manner allows the particles to be bonded together by solid sintering, i.e. the glass particles do not deform or flow but rather the bond is formed when the particles are in the solid state. This type of bond does not decrease the porosity of the resulting mold and provides high strength which is thought to be due in part to the fact that secondary crystals are formed in the glass particles during firing.

Forming a bond by solid sintering prevents the glass particles from flowing into the spaces between the particles thereby maintaining porosity and permeability characteristics equal to plaster of paris.

The above composition and firing also enables the fired article to remain approximately the same size as the corresponding unfired article.

The article (e.g. a mold or die) can be formed to the desired shape in any conventional manner, for example slip casting. In order to give the article the necessary green strength it is preferable to utilize an organic binder and water.

In general, we start out by utilizing particles consisting essentially of from 30 to 90% abrasive particles and from 70% to 10% glass particles. To these particles is added an organic binding agent and sufficient water to form an article of desired shape. In general, the dry components (i.e. the glass particles, organic binders and abrasive refractory material) are mixed together to form a homogeneous admixture and thereafter a proper amount of water is added to form a thick yet fluid composition which can be given the desired shape by casting the composition into molds which could be plaster molds but could also be rubber, etc. The resulting article (e.g. a mold) can be air dried to remove the water and thereafter fired slowly so that the article always has a substantially uniform temperature, the temperature being sufficient to vaporize the organic binder. Thereafter, the temperature is slowly raised until the article reaches a temperature slightly below the fusion range of the glass and the article held at this temperature until the glass particles bond with themselves and the abrasive refractory particles by solid sintering and the glass particles have crystals grown therein during the firing process.

The glass particles may be any conventional glass but it is preferable that the particle size of the glass is less than 325 mesh (i.e. 44 microns). The particle size, to some extent, determines the resultant pore size and therefore the porosity and permeability of the fired article may be determined by the initial particle size of the particles, i.e. the glass particles and the abrasive refractory particles.

The glass particles can be any conventional glass but it is preferred if the fusion point of the glass be at a relatively high temperature since heating the mold above this point will adversely affect the porosity and permeability characteristics of the mold. In other words, if the mold is subjected to temperatures higher than the fusion range of the glass the glass will deform and flow into the spaces between the particles and reduce the porosity and permeability of the mold.

The particular composition of the glass particles is not believed to be important in the present invention and can be any silica glass which may also contain sodium oxide, calcium oxide, boron oxide, zinc oxide, lead oxide, alumina, and various other inorganic ingredients.

The porous abrasive article may contain abrasive particles in an amount from 30 to 90%, by weight, based on the combined weight of glass particles and abrasive refractory particles, and preferably the abrasive refractory particles comprise 30 or 50 to 70%, by weight, said refractory abrasive particles being bonded by the glass particles which may comprise 30 to 50 or 70%, by weight, of the composition based on the combined weight of the glass particles and refractory abrasive particles.

Almost any refractory abrasive particle can be utilized in the present invention and, as exemplary of such refractory abrasive particles, there may be mentioned alumina, quartz, wollastonite, calcined clay, etc.

As in the case of the glass particles it is preferred that the abrasive refractory particles or grains have a particle size of less than 325 mesh.

In general, the glass and the refractory abrasive particles, can be formed into the appropriate shape in a number of ways. One preferred manner is by slip casting but whatever manner is utilized it is generally advantageous to utilize an organic binder and water or other liquid in amounts sufficient to give the composition sufficient workability so that it can be molded or formed into the desired shape. If the particles are slip cast then the amount of organic binder will generally be less than 2% and preferably less than 0.5% by weight based on the weight of the glass particles, refractory abrasive particles, and organic binder. However, if another form of casting or molding is used then the organic binder can be present in amounts of as high as 2 or 3%, by weight, the precise amount of organic binder not being particularly critical since the amount depends upon how the porous mold is formed. If, for example, the glass particles and abrasive particles are to be shaped in a rubber mold and air dried then it is necessary to add 2 to 3% binder, such as a water-soluble polymer or resin, and anywhere from 20 to 30% water. If, on the other hand, the porous article of the present invention is to be shaped by slip casting then the amount of organic binder should be less than 2% and it is generally desirable to use alginates, various gums, or even starch, as the binder. The amount of water used is of course the amount necessary to give the glass and abrasive refractory particles the necessary consistency to be molded, casted, etc.

As has been noted hereinbefore, if the porous article of this invention is to have the desired properties, e.g. good porosity and permeability characteristics coupled with high strength and abrasion resistance together with negligible shrinkage and substantially no surface flaws, the firing temperature must be very carefully selected. First, the temperature must be raised slowly enough to insure that the entire article has the same temperature as well as insuring that the organic binder is slowly vaporized from the article. Once the organic binders burn out and the water has vaporized, the temperature is slowly raised until it is below the fusion range of the glass particles e.g. about 300° to 100° F. below the fusion range. The fusion range of the glass particles can be determined by the shrinkage of the article. If the article starts to shrink then the fusion range has been reached and the temperature is too high. Thus, from a practical standpoint, the temperature of the article is raised to a point below that which the article starts to shrink. The temperature is then held at that point until the mold has a modulus of rupture of at least 4,000 psi and preferably at least 5,000 psi.

The materials (i.e. the glass particles, refractory abrasive particles, and organic binders) and the firing temperature are so chosen that during firing the organic binders do not bloat (this requires a relatively slow increase in temperature) and there is no melting of the glass or refractory abrasive particles during firing. This is essential and critical in the present invention.

The fired mold itself must have certain properties in order to be usable as a porous mold. Generally speaking, the fired porous mold will have no surface flaws, a uniform open porosity of at least 20% by volume and preferably 30% or greater by volume and an average pore size in the range of 1 to 10 microns with the preferable pore size being less than about 5 microns. In addition, it should have high abrasion resistance and a high modulus of rupture, for example, at least 4,000 psi and preferably 5,000 psi and higher.

In order to more fully exemplify the present invention a presently preferred exemplary embodiment for producing a porous mold by slip casting will be given.

Forty parts by weight of an alumino-boro silicate glass having a particle size of less than 325 mesh was mixed with 60 parts by weight of alumina having a particle size of less than 325 mesh and 0.25 parts by weight of an organic binder. To the resulting dry mixture was added 28.5 parts by weight of water while vigorously agitating with a propeller mixer to form a substantially homogenous mixture and to pulverize agglomerations. The resulting aqueous mixture was ball milled approximately three to three and one half hours in order to form a very homogenous mixture. The resulting casting slip was a thick yet fluid composition having a specific gravity of 2.2 to 2.4 g/cc.

The thus formed aqueous composition was formed into the appropriate shape by casting into plaster molds.

The aqueous composition was allowed to dry for two to four hours while in the mold and thereafter was removed and allowed to dry again for 24 to 48 hours. The air dried mold piece which was by this time relatively hard and could be handled with ease was placed in a dryer having a temperature of about 100° F. for 24 to 48 hours to insure that all of the water was removed.

After drying at this temperature the mold was placed in a kiln and the temperature gradually raised to a temperature of about 1000° F. in a five hour period and held at this temperature for about 24 hours to insure that the organic binder was completely burned out. It is important not to remove or vaporize the organic binder too rapidly to prevent bloating. After the 24 hour soak the temperature was gradually raised to about 1500° F. and held at this temperature for about two hours. At the end of two hours we found that an excellent bond is formed between the glass particles and the alumina particles because in part of the formation of aluminosilicate crystals grown in situ. Thereafter the mold is cooled to ambient temperature, the total firing time being 44 hours.

The mold produced as indicated above had excellent porosity, permeability and abrasion resistance. Additionally, it had a high modulus of rupture as well as no surface flaws. Specifically, a mold made by the foregoing procedure was used for 7,000 pressings of moist, coarse clay before the mold had to be discarded. With fine china clays, as many as 15,000 pressings have been made. In contrast thereto, a corresponding plaster mold became unusable after only 300 to 400 pressings. Just as importantly, is the fact that utilizing a mold made in accordance with the foregoing procedure need only be purged every 10 to 19 pressings whereas a corresponding plaster of paris mold need to be purged every 7 pressings, due to absorbed water from the pressed clay. Moreover, purging of the ceramic porous mold of this invention was much more uniform.

The porosity of the foregoing mold was about 40% which is about the same as a plaster of paris mold and better than other gypsum base molds. Additionally, the ceramic mold of the present invention had a modulus of rupture of 5,400 psi and the total shrinkage was only about 0.9%.

Other molds were made utilizing 50% glass particles and 50% alumina particles with a bonding temperature of about 1300° F. A mold made in accordance with this procedure had a pore size distribution of between 1 and 3 microns.

As had been noted hereinbefore, it is desirable if the average pore size of the fired porous ceramic mold is in the range of 1 to 10 microns but it is even more preferred if the pore size is less than 5 microns.

In the embodiment given hereinbefore, a method was exemplified for producing a porous ceramic mold by slip casting. However, as has been noted, this is merely the presently preferred exemplary embodiment and other methods and means can be utilized to produce porous ceramic molds and other porous articles in accordance with the present invention. For example, rather than slip casting a mixture of glass particles and refractory abrasive particles together, an organic binder could be used and about one hour prior to casting water could be added (about 20% water) and the thus formed aqueous mixture poured into a rubber lined mold which will air set in about four hours and thereafter dried in an oven and after drying (substantially all the water is removed) the mold can be fired in the same manner as indicated above. However, in this exemplary embodiment a water-soluble resin binding agent is preferably used in an amount of approximately 3.0 to 5.5%, by weight. The amount of water necessary is about 20% by weight and the same glass and refractory abrasive particles can be used as for slip casting.

As has already been noted, the preferred amount of abrasive refractory particles comprises 50 to 70% by weight based on the combined weight of the refractory abrasive particles and glass particles, however, we have also utilized amount of abrasive refractory particles ranging from 30 or 40 to 90% by weight.

The amount of water necessary to form a body of sufficient strength to handle prior to firing is, of course, dependent upon a number of factors but we have generally found that water can be present in amounts varying from 10 parts by weight to 20 parts by weight (per 100 parts by weight of the combined weight of the glass particles and abrasive refractory particles) to as high as 30 or 40 parts by weight, however, it is believed at the present time that the amount of water is not significant in the present invention.

The amount of organic binder will vary depending on the method of forming the mold. Generally, the amount of organic binder necessary will vary from 0.1 parts by weight (per 100 parts by weight of the combined weight of glass and refractory abrasive particles) to as high as 2 or 3 parts by weight. If slip casting is used then the organic binder will be present in amounts varying from 0.1 to 1 part by weight but if more green strength is required the amount of organic binder may be increased.

The firing temperature can also vary greatly depending on the type of glass used, but it is essential that the highest temperature reached is below the fusion range of the glass but sufficiently high to form a bond between the particles.

It is believed evident from the foregoing description of the present invention that there are many possible embodiments thereof and many changes can be made and it is to be understood that the foregoing description is solely for the purpose of illustration and is not to be considered limiting.

We claim:

1. A fired porous article of desired shape having no surface flaws, a uniform open porosity of at least 20% by volume and an average pore size in the range of 1 to 10 microns, high abrasion resistance and good permeability and a modulus of rupture of at least 4,000 psi, the fired article being substantially the same size as the corresponding unfired article; and consisting essentially of 30 to 90% by weight of refractory abrasive particles and 70 to 10% by weight of silica glass particles said abrasive particles being bonded to each other by said silica glass particles, said bond being formed by solid sintering and said silica glass particles containing crystals of an alumino-silicate which were formed in situ during bonding of the abrasive particles.

2. A fired porous article in accordance with claim 1 wherein the article has a modulus of rupture of at least 5,000 psi and a uniform open porosity of at least 30% by volume.

3. A fired porous ceramic article according to claim 1 which consists essentially of 30 to 70% by weight of refractory abrasive particles and 70 to 30% by weight of silica glass particles.

4. A fired article according to claim 1 wherein the article consists essentially of 50 to 70% by weight of refractive particles bonded by solid sintering with from 50 to 30% by weight of silica glass particles.

5. A porous fired ceramic article according to claim 3 wherein the refractory abrasive particles are alumina.

6. A fired porous article according to claim 1 wherein the glass particles are alumino-boro-silicate glass.

7. A fired porous article according to claim 1 wherein the glass particles contain secondary crystals grown in situ during firing.

8. A fired porous article according to claim 7 wherein the secondary crystals are alumino-silicate crystals grown in situ during firing.

9. A method for producing a porous ceramic article having no surface flaws, a uniform open porosity of at least 20% by volume, an average pore size in the range of 1 to 10 microns, and high abrasion resistance, the fired article being substantially the same size as the corresponding unfired; article which comprises mixing (a) particles consisting essentially of from 30 to 90% of refractory abrasive particles and 70 to 10% of silica glass particles with (b) a sufficient amount of organic binding agent and water to give sufficient strength to form an article of desired shape; forming an article of desired shape from said mixture; drying said article to remove substantially all the water therefrom; firing the resulting dried article by slowly raising the temperature of the article at a sufficient rate so that the entire article has substantially the same temperature throughout and no bloating occurs and until the article reaches a temperature above which the organic binder burns out and holding the article at this temperature until the organic binder is substantially removed and again slowly raising the temperature of the article until it reaches a temperature at which the silica glass particles bond with themselves and with the abrasive particles but below the fusion range of the silica glass particles and holding the article at this temperature until a bond is formed by solid sintering of the particles and until the article has a modulus of rupture of at least 4,000 psi.

10. A method according to claim 9 wherein the amount of refractory abrasive particles is from 30 to 70% and the amount of silica glass particles is from 70 to 30%.

11. A method according to claim 10 wherein the particles size of the refractory abrasive particles is less than 325 mesh.

12. A method according to claim 11 wherein the refractory abrasive particles are alumina.

13. A method according to claim 10 wherein the highest firing temperature is from 300° to 100° F. below the fusion range of the glass.

* * * * *